United States Patent [19]

Huffman

[11] 4,452,511
[45] Jun. 5, 1984

[54] SUBSTITUTED ANTHRACENE-TYPE ISOTROPIC DYES FOR LIQUID CRYSTAL DISPLAY DEVICES

[75] Inventor: William A. Huffman, Minneapolis, Minn.

[73] Assignee: Minnesota Mining and Manufacturing Company, St. Paul, Minn.

[21] Appl. No.: 454,706

[22] Filed: Dec. 30, 1982

[51] Int. Cl.³ .......................... G02F 1/13; C09K 3/34
[52] U.S. Cl. ................................ 350/346; 252/299.01; 252/299.1; 252/299.5; 350/349; 350/351; 350/350 S; 350/350 R
[58] Field of Search ............ 252/299.1, 299.01, 299.5; 350/349, 346, 351, 350 S, 350 R

[56] References Cited

U.S. PATENT DOCUMENTS

| | | | |
|---|---|---|---|
| 3,864,022 | 2/1975 | Moriyama et al. | 252/299.1 |
| 3,960,750 | 6/1976 | Moriyama et al. | 252/299.1 |
| 4,105,299 | 8/1978 | Huffman et al. | 252/299.1 |
| 4,139,273 | 2/1979 | Crossland et al. | 252/299.1 |
| 4,154,746 | 5/1979 | Huffman | 252/299.1 |
| 4,196,974 | 4/1980 | Hareng et al. | 252/299.1 |
| 4,211,473 | 7/1980 | Shanks | 252/299.1 |
| 4,232,950 | 11/1980 | Benham | 252/299.1 |
| 4,324,455 | 4/1982 | Imahori et al. | 252/299.1 |
| 4,391,492 | 7/1983 | Lu et al. | 252/299.01 |
| 4,394,070 | 7/1983 | Brown et al. | 252/299.1 |

FOREIGN PATENT DOCUMENTS

| | | | |
|---|---|---|---|
| 2920730 | 11/1979 | Fed. Rep. of Germany | 252/299.1 |
| 52-3586 | 1/1977 | Japan | 252/299.1 |
| 1569710 | 6/1980 | United Kingdom | 252/299.1 |

OTHER PUBLICATIONS

White, D. L. et al., J. Appl. Phys., vol. 45, No. 11, pp. 4718–4723, (1974).

Tani, C. et al., Appl. Phys. Lett., vol. 33, No. 4, pp. 275–277, (1978).

Cox, R. J., Mol. Cryst. Liq. Cryst., vol. 55, pp. 1–32, (1979).

Primary Examiner—Teddy S. Gron
Attorney, Agent, or Firm—Donald M. Sell; James A. Smith; Jennie G. Boeder

[57] ABSTRACT

Certain substituted anthracene-type compounds have been found to be useful as isotropic dyestuffs in guest-host combinations with nematic, cholesteric and smectic liquid crystals and other well-known dichroic dyestuffs. By "isotropic" it is meant that the disclosed dyestuffs have optical order parameters (S) very close to zero. Use of the disclosed isotropic dyestuffs with additional well-known dichroic dyes in liquid crystal display devices, provides displays which alter between one colored state and another, depending upon the presence or absence of an electric field across the display.

12 Claims, No Drawings

SUBSTITUTED ANTHRACENE-TYPE ISOTROPIC DYES FOR LIQUID CRYSTAL DISPLAY DEVICES

FIELD OF THE INVENTION

This invention relates to guest-host combinations of substituted anthracene-type isotropic dyestuffs and well-known dichroic dyestuffs, with nematic, smectic and cholesteric liquid crystals. This invention further relates to electro-optical devices employing such guest-host combinations. Use of the isotropic dyes disclosed with additional well-known dichroic dyes provides electro-optical devices which are capable of alternating between one colored state and another depending upon the presence or absence of an electric field.

BACKGROUND OF THE INVENTION

The use of dichroic dyes in solution with various liquid crystal materials, and liquid crystal display devices incorporating such mixtures are well-known in the art. These dichroic dye-liquid crystal mixtures may be used in "guest-host" type liquid crystal displays or, when an optically-active additive is employed, in "phase-change" type liquid crystal displays. Additionally, dichroic dyes may be utilized in smectic liquid crystal display devices as disclosed in U.S. Pat. No. 4,196,974, and commonly assigned U.S. Ser. No. 251,247, filed Apr. 6, 1981, now U.S. Pat. No. 4,391,492, and U.S. Ser. No. 436,030, filed Oct. 22, 1982.

Many of these dichroic dyes are elongated molecules which exhibit little or no absorption of light vibrating parallel to the long axis, while absorbing that light in various portions of the visible spectrum which vibrates perpendicular to the long axis. Other dichroic dyes may align oppositely, being colorless (non-absorbing) with respect to light vibrating parallel to the short axis of the molecule and colored (absorbing) with respect to light vibrating perpendicular to the short axis.

In the above-mentioned types of displays the host liquid crystal material has its orientation controlled by the application of electric fields and in turn interacts with the guest dichroic dye to induce a cooperative conforming alignment. The dichroic dye manifests low or high absorbance of incident light depending upon its molecular orientation with respect to the light wave vector. Thus, generally when an electric field is applied to the display, the area between the electrodes appears clear, i.e., all the dyes exhibit minimum absorption, and in the absence of an electric field, the display appears characteristically dye colored, i.e., the dyes are in a high absorbing state.

It is known that by combining two different dichroic dyes, one which absorbs light parallel to the short axis of the molecule, and one which absorbs light parallel to the long axis of the molecule, devices which change from one color to another are possible. It has also been disclosed in U.S. Pat. Nos. 4,105,299 and 4,154,746 that an isotropic, i.e., nondichroic dyestuff, could be combined with a dichroic dyestuff so that the colors of the two would be additive at one stage, and the color of the isotropic dyestuff would appear at the other stage of the electric field cycle, so that a device which changes from one color to another would be possible. One difficulty in providing two-color displays by utilizing isotropic dyes has been to find dyes which are not only isotropic, but which are non-ionic, have acceptable extinction coefficients, sufficient solubility in liquid crystal materials, and good photostability.

SUMMARY OF THE INVENTION

The isotropic dyes of this invention are particular types of 9-substituted, 10-oxo anthracene compounds. These isotropic dyes have measured optical order parameters, S, of about $0 \pm 0.1$. Additionally, the isotropic dyes of this invention have extinction coefficients greater than about $1 \times 10^4$, solubilities in nematic, cholesteric and smectic liquid crystal materials in excess of about 0.1 percent by weight, and good chemical, photochemical and electrochemical stability.

The isotropic dyes disclosed are molecules which do not exhibit a preference for aligning in liquid crystal material along any particular axis. This is due to the fact that the molecules do not have a long and short axis, but have axes which are of near equal length. Thus, the isotropic dyes of this invention are capable of absorbing substantially the same amount of substantially the same wavelengths of incident light regardless of the molecular orientation of the dye molecules with respect to the light wave vector.

DETAILED DESCRIPTION

The isotropic dyes of this invention have the general formula:

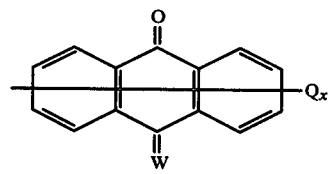

wherein W is selected from the group consisting of

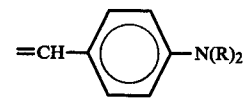

and

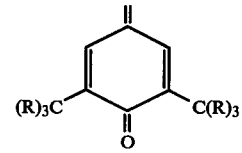

wherein:
R is independently selected from the group consisting of H and $C_nH_{2n+1}$;
Q is independently selected from the group consisting of H, OH, $NH_2$, CN, $OC_nH_{2n+1}$, $NO_2$, $C_nH_{2n+1}$,

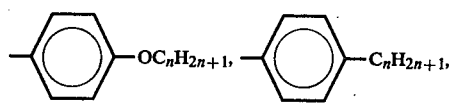

F, Cl, Br, SH, CHO and $CF_3$;
x is 1 to 8; and
n is 0 to about 20.

Exemplary of the preferred anthracene-type isotropic dyestuffs are the following:

| Dye Structure | S in ROTN 404' | $\lambda_{max}$ in ROTN 404' (nm) |
|---|---|---|
| 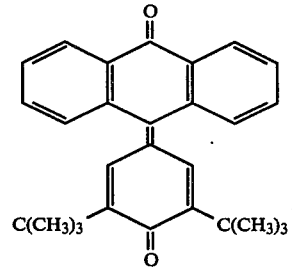 | 0 ± 0.1 | 420 |
| 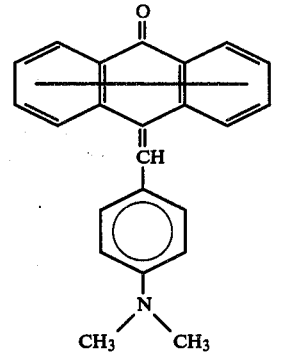 | 0 ± 0.1 | 440 |

"ROTN 404" is a eutectic mixture of biphenylpyrimidine liquid crystals commercially available from Hoffman LaRoche Co.

The isotropic dyes of this invention may be synthesized by the condensation of the appropriately substituted anthrone with the appropriate para-substituted benzaldehyde in inert solvents.

The isotropic dyes of the present invention have absorption maxima at wavelengths between about 400 and 700 nanometers. The absorption maxima for several of the preferred isotropic dyes have been shown hereinabove.

The isotropic dyes of the invention have optical order parameters S which are very close to zero. The optical order parameter is a measure of the efficiency with which the dye is oriented by the liquid crystal material. The determination of the optical order parameter, S, is discussed in Journal of Applied Physics, Vol. 45, No. 11, 4718-23 (1974).

$$S = \frac{A_o - A_1}{A_o + 2A_1}$$

wherein:
A$_o$ is the absorbance in the absence of an electric field; and
A$_1$ is the absorbance in the presence of an electric field.
Since the isotropic dyes of this invention are not aligned along any particular axis by the liquid crystal materials, their absorptivity is not dependent upon the presence or absence of an electric field and their optical order parameters are very close to zero, i.e., about 0±0.1.

The dyes of the invention have relatively high molar extinction coefficients. The molar extinction coefficient is a measurement of the extent to which the dye absorbs light at any particular molar concentration. A dye with a relatively higher molar extinction coefficient provides a display with better brightness characteristics, at any particular molar concentration of dye, than does a dye which has a relatively lower molar extinction coefficient. The extinction coefficients of the isotropic dyes of the invention are generally greater than about $1 \times 10^4$.

The isotropic dyes of the invention are chemically, photochemically and electrochemically stable. For example, the isotropic dyes of the invention remain stable even after greater than about $3 \times 10^5$ hours of exposure to ultraviolet radiation.

In order for isotropic dyes to be useful in liquid crystal display devices, the dye molecule must have suitable solubility in the host liquid crystal material. Solubilities of greater than about 0.1 percent by weight insure that the dye will have sufficient absorptivity to be useful in displaying its characteristic color. The dyes of the present invention have solubilities in most well-known nematic, smectic and cholesteric liquid crystals of greater than about 0.1 percent by weight.

The host liquid crystal material may be any nematic, smectic or cholesteric liquid crystal compound which is per se known in the art. The nematic liquid crystals can have either a positive or negative dielectric anisotropy. As used herein the term "positive" or "negative" refers to the net dielectric anisotropy where mixtures are used. Generally liquid crystals having higher absolute values of dielectric anisotropy are preferred. At this time the positive nematic materials having high dielectric anisotropy are more readily available. Mixtures of positive and negative materials are also useful, particularly those mixtures having a net positive dielectric anisotropy.

Readily available positive nematic liquid crystal materials which have been found suitable include trans-4-n-pentyl-(4'-cyano-phenyl)-cyclohexane, trans-4-n-pentyl-(4'-cyano-biphenyl)-4-cyclohexane, p-n-hexylbenzylidene-p'-amino-benzonitrile, p-methoxybenzylidene-p'-amino-benzonitrile, p-ethoxybenzylidene-p'-amino-benzonitrile, p-cyano-benzylidene-p'-n-butyoxyaniline, p-cyanobenzylidene-p'-octyloxyaniline, 4-cyano-4'-alkyl(or alkoxy)biphenyl, 4-cyanophenyl-4'-alkyl(or alkoxy)benzoate, 4-alkyl(or alkoxy)phenyl-4'-cyanobenzoate, and the family of alkyl phenyl pyrimidines.

Eutectic mixtures and combinations are also useful. Illustrative are eutectic mixtures of 4'-substituted-4-cyanobiphenyl wherein the 4' substituents are alkyl or alkoxy of 3 to 12 carbon atoms, and terphenyl liquid crystals. Representative is the commercially available "E7" mixture from B.D.H. Ltd. Another useful mixture is commercially available from Hoffman LaRoche under the trade name "ROTN 404." "ROTN 404" is a eutectic mixture of biphenyl pyrimidine liquid crystals. Yet another useful mixture of compounds comprises mixtures of the phenylcyclohexanes referred to above such as mixtures comprising the 4-alkyl-(4'-cyano-phenyl)cyclohexanes, mixtures comprising 4-alkyl-(4'-cyanobiphenyl)cyclohexanes, and mixtures comprising both types of compounds. One useful commercial mixture is identified as Nematic Phase 1132 TNC "Licristal" or "PCH 1132" from Hoffman LaRoche, Inc.

Representative of nematic liquid crystals having negative dielectric anisotropy which would be useful in the present invention is the liquid crystal "EN-18" available from Chisso Corporation.

Representative cholesteric liquid crystals which are useful in the practice of the present invention include cholesterol benzoate, cholesterol nonanoate, cholesterol chloride, cholesterol hexanonanoate, and 4-(+)(2-methylbutyl)-4′-cyanobiphenyl.

Representative smectic liquid crystals which are useful in the practice of the present invention include the well-known cyano biphenyls or esters of substituted cyano biphenyls, for example, p-(N)octyloxy-p′-cyano biphenyl and bis(p,p′)(N)-pentyloxy-phenyl benzoate.

The isotropic dyes of the invention may be utilized along with other well-known dichroic dyes in numerous types of liquid crystal displays. The construction of "guest-host" type liquid crystal displays is described in *Applied Physics Letters*, Vol. 13, pages 91–92 (1968), incorporated herein by reference. "Phase-change" type displays are described by D. L. White and G. N. Taylor in "New Absorptive Mode Reflective Liquid Crystal Display Device," *Journal of Applied Physics*, Vol. 45, pp. 4718–4723, (1974), also incorporated herein by reference. Briefly both types of devices comprise a typical transmissive or reflective liquid crystal display cell having appropriate front and back electrode patterns and featuring a homogeneously or homeotropically oriented liquid crystal layer comprising host positive nematic liquid crystal, and a guest dichroic dye. In "phase-change" type displays an optically-active dopant is present in amounts sufficient to provide a cholesteric or helically ordered liquid crystal phase. The "host" liquid crystal material has its orientation controlled by the application of electrical fields and in turn interacts with "guest" dichroic dye molecules to induce a cooperative conforming alignment.

Normally, "guest-host" type displays in the "off" state (no electric field present) require one polarizer to absorb one polarization of incident light while the guest dichroic dye material in the display absorbs the other polarization. In the presence of an electric field, the host liquid crystal material, and thus the guest dichroic dye, are generally oriented by the electric field so that the dichroic dye molecules assume their essentially nonabsorbing state. In this state, the dichroic dye is oriented to absorb relatively little incident light, and a "clear" area, corresponding to the electrode area, on a background, corresponding to the characteristic color of the dichroic dye, is observed. By selective activation of the electrodes, information can be readily displayed.

In "phase-change" type displays the helical ordering of the host liquid crystal material is superimposed upon the dichroic dye. The helically ordered dichroic dye is thus able to absorb both polarizations of incident light thereby producing a brighter display since no auxiliary polarizers are required, as they are in the "guest-host" type displays. In the absence of an electric field across the display electrodes, the dichroic dye is oriented to absorb a substantial amount of the unpolarized incident light and the display area exhibits a color characteristic of the dichroic dye. When an electric field is applied to the desired electrode, the liquid crystal layer in register with the electrode is caused to change from a cholesteric phase to a nematic phase, generally in homeotropic alignment due to the positive dielectric anisotropy of the liquid crystal host material. In this state, the dichroic dye in the liquid crystal layer is oriented to absorb relatively little incident light, and a "clear" area, corresponding to the electrode area on a colored background, is observed.

When an isotropic dye of the present invention is included in a "guest-host" or "phase-change" type display a two-color display is produced. When the electric field is off both the isotropic and the dichroic dyes absorb incident light, and an additive color due to both dyes is observed. When an electric field (at or above the threshold level) is applied ("on" state), the dichroic dye assumes its essentially nonabsorbing state while the isotropic dye absorption is almost unchanged and a color which is characteristic of the isotropic dye alone appears. As a result, different colored states can be achieved.

Additionally, the isotropic dyes of the invention have proven to be particularly useful in combination with helichromic compounds in helichromic-type liquid crystal displays. Helichromic compounds and displays are disclosed in copending U.S. patent application Ser. No. 274,184, filed June 22, 1981, now U.S. Pat. No. 4,394,070, incorporated herein by reference. These displays are constructed in the same manner as the "phase-change" type displays, except that a helichromic compound, having both a chromophoric moiety and an optically-active moiety is used to replace both the dichroic dye and the optically-active dopant. Helichromic compounds are organic, nonionic, nonliquid-crystalline compounds which are soluble in nematic, cholesteric and smectic liquid crystal materials. Helichromic compounds are capable of being aligned by liquid crystal materials, and are capable of performing as circularly dichroic dyes when used in liquid crystal display devices. In helichromic-type displays the helichromic compound is used in amounts sufficient to insure that incident light is propagated in a circularly polarized manner, so that all polarizations of the incident light are absorbed.

In the helichromic displays, in the absence of an electric field across the display electrodes, the helichromic compound is oriented to absorb a substantial amount of the unpolarized incident light and the display exhibits a color which is characteristic of the helichromic compound. When an electric field is applied to the desired electrodes, the liquid crystal layer in register with the electrodes is caused to change to a nematic phase, generally in homeotropic alignment. In this state the helichromic compound in the liquid crystal layer is oriented to absorb relatively little incident light, and a "clear" color is observed in the area corresponding to the electrode area.

When an isotropic dye of the invention is included in a helichromic display a two-color display is produced. When the electric field is off both the isotropic dye and the helichromic compound (which is itself a circularly dichroic dye) absorb incident light, and an additive color due to both dyes is observed. When an electric field is applied at or above the threshold level, the helichromic compound assumes its non-absorbing state, and a color characteristic of the isotropic dye alone is observed.

Yet another use for the isotropic dyes of the invention is in thermally-addressed smectic liquid crystal display devices, as described in U.S. Pat. No. 4,196,974 and U.S. Ser. No. 251,247, filed Apr. 6, 1981, now U.S. Pat. No. 4,391,492, both of which are incorporated herein by reference. Generally, a thermally-addressed smectic liquid crystal display device comprises a typical transmissive or reflective liquid crystal display having appropriate front and back electrode patterns and featuring a smectic liquid crystal medium including at least one dichroic dye of high order parameter. The liquid crystal medium is thermally sensitive and has a transition between an upper thermal state and a lower smectic phase. The upper thermal state is either a nematic or isotropic state, or, where the liquid crystal medium includes at least one cholesteric liquid crystal compound, a cholesteric state. The device is operated by heating the medium to its upper thermal state. The medium is then rapidly cooled while a portion of the mixture is addressed by the application of an electric field. A homeotropic light transmissive state is normally developed in the portions of the mixture which are addressed by the electric field, while a light absorbing state develops in the unaddressed portions of the mixture. The dichroic dye in the portion of the mixture which is unaddressed, absorbs incident light passing through the medium; the liquid crystal medium acting as a vehicle to orient the dichroic dye molecules into a light absorbing position. Electrodes are provided adjacent the liquid crystal medium, and heating electrodes are also provided to heat the medium to the upper thermal phase. By selective activation of the electrodes, information can be readily displayed.

When an isotropic dye of the present invention is included in the smectic liquid crystal medium, along with the dichroic dye, a two-color display can be produced. After heating the medium to its upper thermal state, in those portions of the medium which are allowed to cool in the absence of an electric field, both the isotropic and dichroic dyes will absorb incident light, and an additive color due to both dyes appears. In those portions of the medium which are allowed to cool in the presence of an electric field, the dichroic dye absorption is minimal, while the isotropic dye absorption is almost unchanged, so that a color due to the isotropic dye alone appears.

Furthermore, the isotropic dyes of the invention can be utilized in the more recently discovered helichromic-smectic liquid crystal displays which are described in commonly assigned co-pending U.S. Ser. No. 436,030, filed Oct. 22, 1982, incorporated herein by reference.

The helichromic-smectic liquid crystal display is constructed and operated in the same manner as the smectic liquid crystal displays described hereinabove, except that a helichromic compound, having a chromophoric moiety and an optically-active moiety is used to replace both the dichroic dye and any cholesteric material.

When an isotropic dye of the present invention is included in a helichromic-smectic liquid crystal display device, and the medium is heated to its upper thermal state (called a helichromic state), those portions of the medium which are allowed to cool in the absence of an electric field appear as an additive color, due to the absorbance of both the helichromic compound and the isotropic dye. Those portions of the medium which are allowed to cool in the presence of an electric field appear a color which is characteristic of the isotropic dye alone.

The concentration of isotropic dye which is useful in all of the above-described types of liquid crystal displays is between about 0.1 and 5 percent by weight of the liquid crystal materials. Preferably the concentration of isotropic dye is between about 1.0 and 3.0 percent by weight, for optimal color characteristics.

The various dichroic dyes or helichromic compounds of the prior art, which are advantageously used to provide two-color liquid crystal displays, have absorption maxima between about 400 and 750 nm. Preferably also, the dichroic dyes or helichromic compounds have optical order parameters (S) of greater than about 0.5 in order to insure displays having high contrasts and brightness.

Suitable dichroic dyes of the prior art are well-known azo, azo-stilbene, benzothiazolylpolyazo methine, azomethine, merocyanine, methine-arylidene, tetrazine, oxadiazine, carbazole-azo or anthraquinone type dichroic dyes, such as those disclosed in U.S. Pat. Nos. 4,145,114; 4,128,497; 4,179,395; and in Applicants' co-pending U.S. Ser. No. 70,421 filed Aug. 28, 1979.

Exemplary well-known dichroic dyes which are useful when combined with the isotropic dyes of the present invention are shown hereinbelow.

| Dye | S in ROTN 404 | λmax in ROTN 404 |
|---|---|---|
| 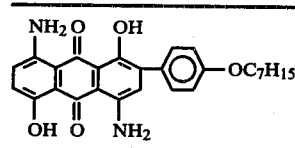 | 0.74 | 610 |
| 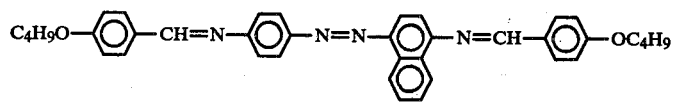 | 0.79 | 440 |

Exemplary helichromic compounds which are useful when combined with the isotropic dyes of the present invention are shown hereinbelow.

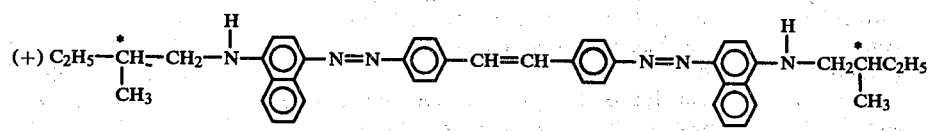

λmax in ROTN 404 = 550 nm

-continued

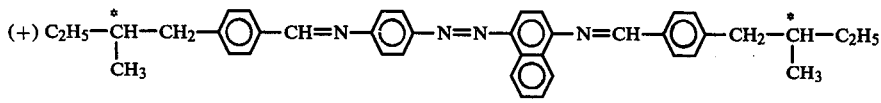

λ<sub>max</sub> in ROTN 404 = 440 nm

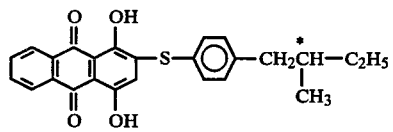

λ<sub>max</sub> in ROTN 404 = 460 nm

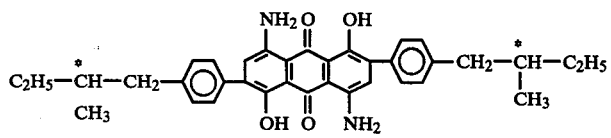

λ<sub>max</sub> in ROTN 404 = 630 and 660 nm

The concentration of the dichroic dye (or helichromic compound) which is useful in the "guest-host," "phase-change" "helichromic" and "smectic" type liquid crystal displays is between about 0.1 and 5 percent by weight of the liquid crystal material. A preferred concentration is between 1 and 2 percent by weight in order to achieve optimal contrast and brightness. Of course, the maximum amount of dichroic dye which can be present is dependent upon the solubility of the dye in the liquid crystal materials.

The ratio of the dichroic dye to the isotropic dye present in the display is preferably that which will cause the absorption of light by the dichroic dye to be at least equivalent to the absorption of light by the isotropic dye. This is accomplished by adjusting the concentration of each individual dye so that the absorbance at the wavelength of maximum absorption ($\lambda_{max}$) for each dye is approximately equal.

Generally, the ratio of dichroic dye concentration to isotropic dye concentration is between about 1:5 to 5:1, depending upon the molar extinction coefficient of each dye and the desired optical contrast.

The following examples illustrate compositions and devices in accordance with the invention. The optical order parameters (S), and λmax were measured in ROTN 404.

EXAMPLE 1

A "phase-change" type liquid crystal display which is bright green in the absence of an electric field and is yellow in the presence of an electric field was constructed as follows:

A display cell was assembled comprising two opposing glass plates coated on their interior surfaces with tin/indium oxides to form a conductive electrode pattern. Overlaying the electrode pattern, a homeotropic orientation layer was created by the vapor deposition of a dielectric silicon monoxide layer about 100 Å thick, at an angle greater than 30°. The cell was provided with a reflectorized backing, and had a 12 μm cell spacing.

The cell was filled with a mixture of nematic liquid crystal materials, 5 percent by weight of the cholesteric additive (+)4-(2-methylbutyl)-4'-cyano biphenyl (commercially available as "CB-15" from Hoffman LaRoche), 0.5 percent by weight of the isotropic dye.

| | S | λ<sub>max</sub> (nm) |
|---|---|---|
| (structure) | 0 ± 0.1 | 440 | and 0.5 percent by weight of the dichroic dye

| | S | λ<sub>max</sub> |
|---|---|---|
| (structure) | 0.74 | 610 nm |

The isotropic dye was synthesized by the condensation of anthrone and p-(N',N-dimethylamino)benzaldehyde in absolute ethanol, using a catalytic quantity of p-toluene sulfonic acid.

The dichroic dye was synthesized by condensing 1,5-dihydroxy-4,8-diamino-anthraquinone-2-sulfonic acid with 1 equivalent of heptyloxybenzene in sulfuric acid.

The mixture of nematic liquid crystal materials comprised:

| | % by weight |
|---|---|
| H<sub>3</sub>C(CH<sub>2</sub>)<sub>4</sub>O—⟨⟩—⟨⟩—CN | 30 |

-continued

| | % by weight |
|---|---|
| H₃C(CH₂)₇O—⌬—⌬—CN | 15 |
| H₃C(CH₂)₄—⌬—⌬—⌬—CN | 10 |
| H₃C(CH₂)₄—(pyridazine)—⌬—CN | 10 |
| H₃C(CH₂)₆—(pyridazine)—⌬—CN | 20 |
| H₃C(CH₂)₃—⌬—(pyridazine)—⌬—CN | 15 | age (greater than the threshold voltage) the dichroic dye assumed a low absorbance orientation in the cell and the cell exhibited maximum absorbance only at about 440 nm. The cell in the voltage "on" state appeared yellow in color. Thus, a satisfactory two-color phase-change type liquid crystal display was produced.

EXAMPLE 2

A thermally addressed smectic/helichromic liquid crystal display, which appears yellow when in the "off" state, and bright green when a heating pulse is applied, was constructed as follows:

A display cell was assembled comprising two opposing glass plates. The bottom substrate was coated on its interior surface with an aluminum coating having 0.1 ohms per square resistance. This aluminum coating forms the row heating electrode and the bottom addressing electrode. The top substrate was coated with an 0.1 micrometer thick coating of indium/tin oxide, to form a thin conductive transparent column addressing electrode. Overlaying the electrodes, a homeotropic orientation layer was created by the vapor deposition of a dielectric silicon monoxide layer about 100 Å thick, perpendicular to the glass plates. The cell had a spacing of 15 μm.

The cell was filled with a mixture comprising 0.98 of the nematic liquid materials of Example 1, and the indicated amounts of the following smectic liquid crystal materials:

| | |
|---|---|
| $H_{21}C_{10}$—O—⌬—⌬—CN | 1.48 g |
| $H_{25}C_{12}$—⌬—⌬—CN | 3.06 g |
| $H_{21}C_{10}$—⌬—⌬—CN | 1.32 g |
| $H_{17}C_8$—⌬—⌬—CN | 2.51 g | to which was added 0.1 grams of the isotropic dye,

| S | λ_max |
|---|---|
| 0 ± 0.1 | 420 |

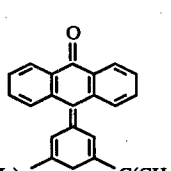

and 0.1 grams of the helichromic compound

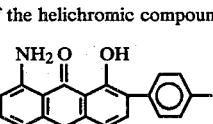

λ_max = 630 and 660 nm

Electrical contacts were made to the indium/tin oxide coating and these were connected to a switching circuit including a source of low voltage alternating current capable of providing an RMS voltage of 20 volts, 1 kHz. In the absence of a voltage the cell exhibited absorbance maxima at 440 and 610 nm and appeared bright green in color. In the presence of a volt- The isotropic dye was synthesized by dissolving one equivalent of anthrone in methanol along with 1 equivalent of 4-hydroxy-2,6-di(tertiary butyl) benzaldehyde. Sulfuric acid was used as a catalyst. The isotropic dye was recovered by filtration and crystallization from isopropanol.

The helichromic compound was prepared according to the procedure described in commonly assigned, copending U.S. Ser. No. 251,247, filed Apr. 6, 1981, now U.S. Pat. No. 4,391,492, incorporated herein by reference.

The operational cell in the absence of an electric field, or any application of heat, exhibited an absorbance maximum at about 420 nm, and appeared yellow in color. This yellow color was due to the absorbance of the isotropic dye alone, since the helichromic compound was in its low absorbance state. However, when a row heating pulse of 40 volts was applied for 6 milliseconds, the display in the heated area exhibited absorbance maxima at about 420, 630 and 660 nm, and appeared a brilliant green. This green color was due to the additional absorbance of the helichromic compound which was now in its absorbing state. The application of an electric field while heating the display resulted in the original yellow coloration.

What we claim is:

1. A composition of matter comprising a nematic, smectic or cholesteric liquid crystal material, at least one dichroic dyestuff, and an isotropic dyestuff having the general formula

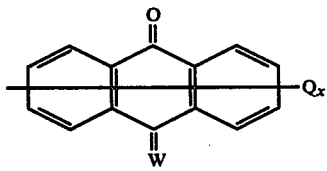

wherein W is selected from the group consisting of

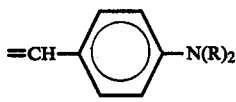

and

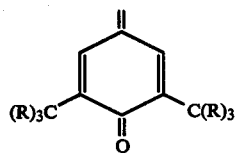

wherein:
R is independently selected from the group consisting of H and $C_nH_{2n+1}$;
Q is indepedently selected from the group consisting of H, OH, $NH_2$, CN, $OC_nH_{2n+1}$, $NO_2$, $C_nH_{2n+1}$,

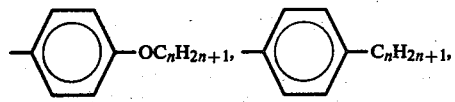

F, Cl, Br, SH, CHO and $CF_3$;
x is 1 to 8; and
n is 0 to about 20,
wherein said isotropic dyestuff has an optical order parameter of about 0.

2. The composition of claim 1 wherein said isotropic dyestuff is selected from the group consisting of

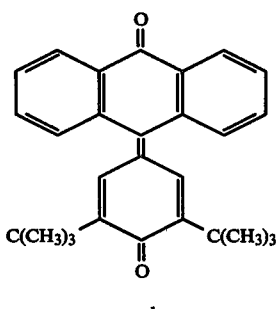

and

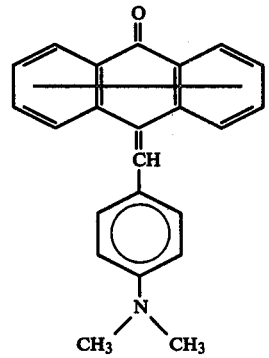

3. The composition of claim 1 wherein said dichroic dye is an azo, azo-stilbene, benzothiazolylpolyazo, methine, azomethine, merocyanine, methinearylidene, tetrazine, oxadiazine, carbazole-azo or anthraquinone type dye, having an absorption maxima between about 400 and 700 nm, and having an optical order parameter of greater than about 0.5.

4. The composition of claim 1 wherein the concentration of said isotropic dyestuff is about 0.1 to 5 percent by weight of said liquid crystal material, and the concentration of said dichroic dyestuff is about 0.1 to 5 percent by weight of said liquid crystal material.

5. The composition of claim 1 wherein there is additionally present an optically-active dopant in an amount sufficient to cholesterically order said composition of matter.

6. The composition of claim 1 wherein said dichroic dye is a helichromic compound, said helichromic compound being a circularly dichroic dye having both a chromophoric moiety and an optically-active moiety, and said helichromic compound is present in said composition in an amount sufficient to enable said composition to propagate light in a circularly polarized manner.

7. An improved "guest-host" type liquid crystal display which is responsive to the absence or presence of an electric field, and which appears one color in the absence of said electric field and another color in the presence of said electric field, said device comprising:
   (a) a "guest-host" layer comprising a nematic liquid crystal material and at least one dichroic dye which has an absorption maximum between about 400 and 700 nm; and
   (b) two conductive electrodes positioned, respectively, adjacent opposing surfaces of said layer;
wherein the improvement comprises the presence of the isotropic dyestuff of claim 1 in admixture with said "guest-host," liquid crystal-dichroic dye mixture.

8. An improved "phase-change" type liquid crystal display device which is responsive to the absence or presence of an electric field, and which appears one color in the absence of said electric field and another color in the presence of said electric field, said device comprising:
 (a) a layer of a nematic liquid crystal material in admixture with at least one dichroic dye which has an absorption maximum between about 400 and 700 nm, and an optically-active compound; and
 (b) two conductive electrodes positioned, respectively, adjacent opposing surfaces of said layer;
wherein the improvement comprises the presence of the isotropic dyestuff of claim 1 in admixture with said liquid crystal material-dichroic dye mixture.

9. An improved "helichromic" type liquid crystal display device which is responsive to the absence or presence of an electric field, and which appears one color in the absence of an electric field and another color in the presence of said electric field, said device comprising:
 (a) a layer of a nematic liquid crystal material in admixture with an organic, nonionic, nonliquid-crystalline helichromic compound, said helichromic compound comprising at least one chromophoric moiety, and at least one optically-active moiety, and said helichromic compound being a circularly dichroic dye having an absorption maximum between about 400 and 700 nm; and
 (b) two conductive electrodes positioned, respectively, adjacent opposing surfaces of said layer;
wherein the improvement comprises the presence of the isotropic dyestuff of claim 1 in admixture with said liquid crystal-helichromic compound mixture.

10. An improved thermally-addressable liquid crystal display device, which is responsive to the absence or presence of an electric field, and which appears one color in the absence of said electric field and another color in the presence of said electric field, said device comprising:
 (a) a layer of a liquid crystal medium in admixture with at least one dichroic dye which has an absorption maximum between about 400 and 700 nm, said layer disposed between a top substrate and a bottom substrate, said liquid crystal medium being thermally sensitive and having a transition between at least two thermal phases, an upper phase being a nematic or isotropic phase and a lower thermal phase being a smectic phase, said mixture having two possible states of orientation in said smectic phase, a first orientation state being a state in which said dichroic dye is substantially light absorbing and a second state being a state in which said dichroic dye is substantially light transmissive;
 (b) a means of affecting a thermal transition between said lower thermal phase and said upper thermal phase; and
 (c) a means of electrically addressing portions of said mixture to develop said second orientation state when said mixture passes rapidly into said lower thermal state from said upper thermal state, the remaining unaddressed portions of said mixture developing said first orientation state when said mixture passes rapidly into said lower thermal state from said upper thermal state;
wherein the improvement comprises the presence of the isotropic dyestuff of claim 1 in said liquid crystal medium.

11. An improved thermally-addressable "cholesteric-smectic" type liquid crystal display device which is responsive to the absence or presence of an electric field, and which appears one color in the absence of said electric field and another color in the presence of said electric field, said device comprising:
 (a) a layer of a smectic liquid crystal medium in admixture with at least one dichroic dye which has an absorption maximum between about 400 and 700 nm, and an optically-active cholesteric compound, said layer disposed between a top substrate and a bottom substrate, said liquid crystal medium being thermally sensitive and having a transition between at least two thermal phases, an upper phase being a cholesteric or isotropic phase and a lower thermal phase being a smectic phase, said mixture having two possible states of orientation in said smectic phase, a first orientation state being a state in which said dichroic dye is substantially light absorbing and a second state being a state in which said dichroic dye is substantially light transmissive;
 (b) a means of affecting a thermal transition between said lower thermal phase and said upper thermal phase; and
 (c) a means of electrically addressing portions of said mixture to develop said second orientation state when said mixture passes rapidly into said lower thermal state from said upper thermal state, the remaining unaddressed portions of said mixture developing said first orientation state when said mixture passes rapidly into said lower thermal state from said upper thermal state;
wherein the improvement comprises the presence of the isotropic dyestuff of claim 1 in said liquid crystal medium.

12. An improved thermally-addressable "helichromic-smectic" liquid crystal display device which is responsive to the absence or presence of an electric field, and which appears one color in the absence of said electric field and another color in the presence of said electric field, said device comprising:
 (a) a layer of a smectic liquid crystal medium in admixture with an organic, nonionic, nonliquid-crystalline helichromic compound, said helichromic compound comprising at least one chromophoric moiety and at least one optically-active moiety, and said helichromic compound being a circularly dichroic dye, having an absorption maximum between about 400 and 700 nm, said layer disposed between a top substrate and a bottom substrate, said liquid crystal medium being thermally sensitive and having a transition between at least two thermal phases, an upper phase being a helichromic phase and a lower thermal phase being a smectic phase, said mixture having two possible states of orientation in said smectic phase, a first orientation state being a state in which said helichromic compound is substantially light absorbing and a second state being a state in which said helichromic compound is substantially light transmissive;
 (b) a means of affecting a thermal transition between said lower thermal phase and said upper thermal phase; and
 (c) a means of electrically addressing portions of said mixture to develop said second orientation state when said mixture passes rapidly into said lower thermal state from said upper thermal state, the remaining unaddressed portions of said mixture developing said first orientation state when said mixture passes rapidily into said lower thermal state from said upper thermal state;
wherein the improvement comprises the presence of the isotropic dyestuff of claim 1 in said liquid crystal medium.

* * * * *